US007603390B2

(12) United States Patent
Jump et al.

(10) Patent No.: US 7,603,390 B2
(45) Date of Patent: Oct. 13, 2009

(54) METHODS AND SYSTEMS FOR RECOVERING DATA FROM CORRUPTED ARCHIVES

(75) Inventors: Dan Jump, Duvall, WA (US); Li Hua, Redmond, WA (US); Simon Leet, Bellevue, WA (US); Josh Pollock, Seattle, WA (US); Scott Walker, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 412 days.

(21) Appl. No.: 11/182,117

(22) Filed: Jul. 15, 2005

(65) Prior Publication Data

US 2007/0016547 A1 Jan. 18, 2007

(51) Int. Cl.
*G06F 12/00* (2006.01)
*G06F 17/30* (2006.01)
(52) U.S. Cl. ...................... 707/202; 707/204
(58) Field of Classification Search .................. 707/202
See application file for complete search history.

(56) References Cited

U.S. PATENT DOCUMENTS 6,912,645 B2 * 6/2005 Dorward et al. ............. 711/216

7,111,322 B2 * 9/2006 Slick et al. ...................... 726/5

OTHER PUBLICATIONS

Ford, Bryan, "VXA: A Virtual Architecture for Durable Compressed Archives," FAST'05: 4th USENIX Conference on File and Storage Technologies, 2005.*

* cited by examiner

*Primary Examiner*—Kuen S Lu
*Assistant Examiner*—Rachel J Lee
(74) *Attorney, Agent, or Firm*—Merchant & Gould

(57) ABSTRACT

Systems and methods are disclosed for recovering data. The disclosed systems and methods may include locating a central directory in a file archive. Furthermore, the disclosed systems and methods may include determining that a local header located in the file archive is authentic if at least one of a plurality of records in the local header match at least one of a corresponding record in the central directory. The local header may be located in the file archive using an offset specified in the central directory. Moreover, the disclosed systems and methods may include determining that the local header is valid and recovering item data associated with the local header if the local header is authentic and valid.

20 Claims, 9 Drawing Sheets

METHODS AND SYSTEMS FOR RECOVERING DATA FROM CORRUPTED ARCHIVES

BACKGROUND

The present invention generally relates to methods and systems for recovering data. More particularly, the present invention relates to recovering data from corrupted archives.

Data recovery is a process for recovering data from a corrupt file or archive. With existing file formats, file archives are susceptible to corruption. Once the archive has been corrupted, the archive is no longer useful to a user. In some situations, for example, "zip" archives can be easily corrupted by situations such as truncations, bit flips, or zeroed data chunks. For example, typical zip implementations cannot handle these corruptions, resulting in partial or total data loss in the archive. This often causes problems because conventional strategies do not allow for recovering data from a corrupt file or archive.

In view of the foregoing, there is a need for methods and systems for recovering data. Furthermore, there is a need for recovering data from corrupted archives.

SUMMARY

Consistent with embodiments of the present invention, systems and methods are disclosed for recovering data.

In accordance with one embodiment, a method for recovering data comprises locating a central directory in a file archive determining that a local header located in the file archive is authentic if at least one of a plurality of records in the local header match at least one of a corresponding record in the central directory, the local header being located in the file archive using an offset specified in the central directory, determining that the local header is valid, and recovering item data associated with the local header if the local header is authentic and valid.

According to another embodiment, a system for recovering data comprises a memory storage for maintaining a database and a processing unit coupled to the memory storage, wherein the processing unit is operative to locate a central directory in a file archive, determine that a local header located in the file archive is authentic if at least one of a plurality of records in the local header match at least one of a corresponding record in the central directory, the local header being located in the file archive using an offset specified in the central directory, determine that the local header is valid, and recover item data associated with the local header if the local header is authentic and valid.

In accordance with yet another embodiment, a computer-readable medium which stores a set of instructions which when executed performs a method for recovering data, the method executed by the set of instructions comprising locating a central directory in a file archive, determining that a local header located in the file archive is authentic if at least one of a plurality of records in the local header match at least one of a corresponding record in the central directory, the local header being located in the file archive using an offset specified in the central directory, determining that the local header is valid, and recovering item data associated with the local header if the local header is authentic and valid.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
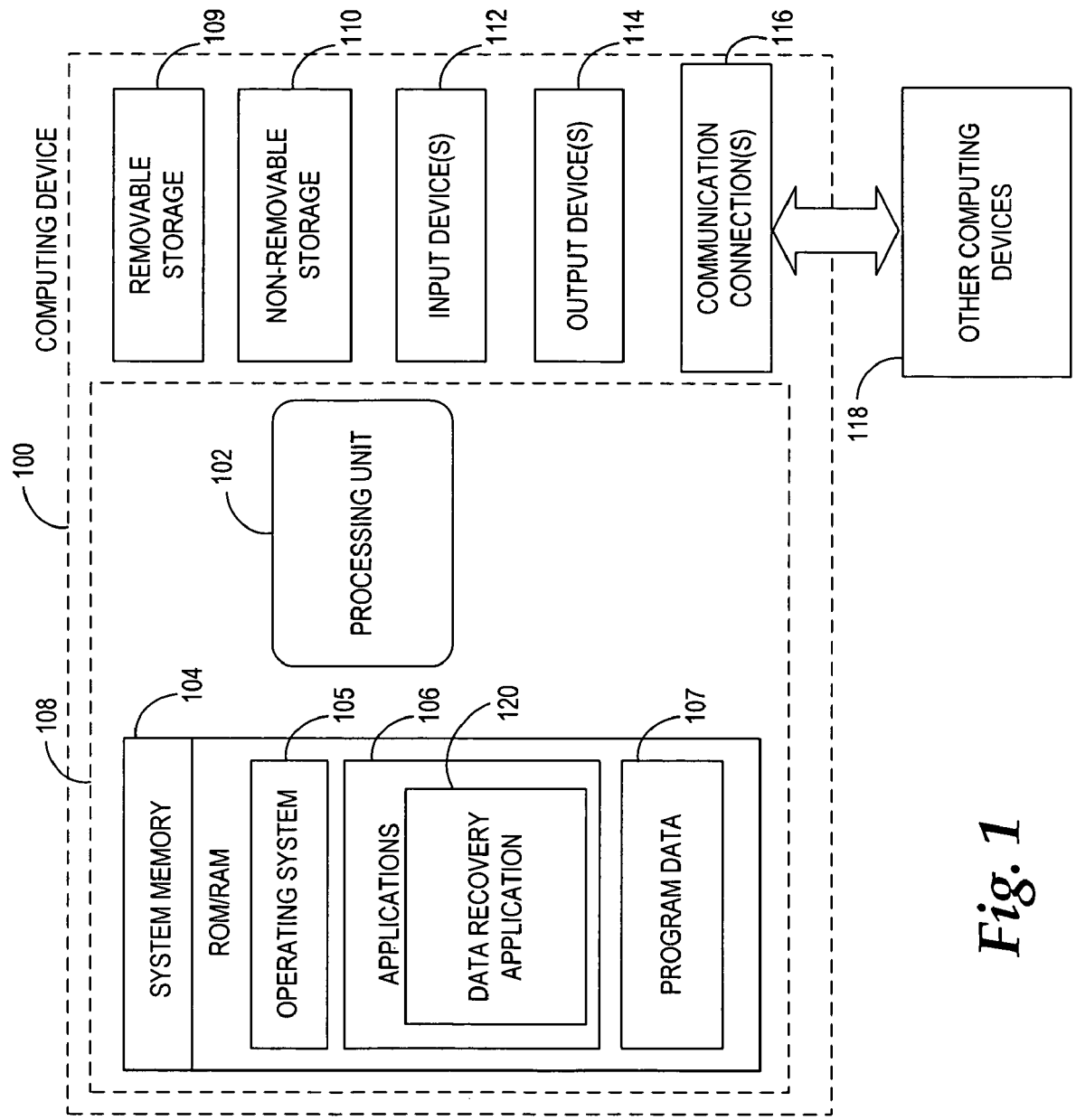
FIG. 1 is a block diagram of an exemplary computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention recover data. For example, embodiments of the invention may find items in an archive and resolve inconsistencies between records in the archive. The archive may be, but is not limited to, a "zip" file format. For example, the archive may be in a format that meets the following characteristics: i) stores items as contiguous ranges of bytes in the archive; ii) each item in the archive may be preceded (or followed) by a "local header" (LH) (or footer) that may specify the size of the item; and iii) the archive may contain a "central directory" (CD) or "table of contents" type structure. The CD may comprise a collection of records at the end of an archive. Each record may contain information about a single item including, for example, a name, size, and offset. The LH may comprise a record that precedes each item in the archive that may contain a subset of the CD record field such as name and size. Furthermore, the archive may contain an end of central directory (ECD) comprising, for example, one or three records at the end of the CD. Table 1 below shows fields in an exemplary ECD. In addition, a "gap" may comprise the space in the archive not marked as used by validated items.

TABLE 1

|  | Used? | End CDR | Used? |
|---|---|---|---|
| Zip64 ECD |  |  |  |
| Signature | No | Signature | No |
| Size | No | Disk Number | No |
| Made By Version | No | CD Disk Number | No |
| Extract Version | No | Number of CD Entries (disk) | No |
| Disk Number | No | Number of CD Entries (total) | No |
| CD Disk Number | No | CD Size | Yes |
| Number of CD Entries (disk) | No | CD Offset | Yes |
| Number of CD Entries (total) | No | ZIP Comment Length | No |
| Size of CD | Yes | ZIP Comment | No |
| CD Offset | Yes |  |  |
| Zip64 Extensible Field | No |  |  |
| Zip64 Locator |  |  |  |
| Signature | No |  |  |
| Disk Number | No |  |  |
| Zip64 ECD Offset | Yes |  |  |
| Number of Disks | No |  |  |

Consistent with an embodiment of the present invention, data recovery may occur in four stages that may build upon each other. The first stage, for example, may be to find the CD. If the file (or archive) is truncated, some or all of the ECD may be gone. For example, bit flips may cause the offsets to point at a wrong location. Furthermore, the signature of the first CD entry may be corrupted. If the CD cannot be found, there may be no CD records in the list, taking the data recovery process directly to the LH recovery stage (i.e. the forth stage described below.) Special cases may exist for archives that contain, for example, 0 to 21 data bytes. Because 22 bytes may be the minimum size of a valid archive containing data, anything smaller than that may not contain recoverable data. Archives of this size may not be recoverable.

In finding the CD, one of three cases may be true: i) the CD offset is pointing to a valid CD signature; ii) the CD offset plus the CD size equals the ECD offset; or iii) the ECD offset minus the CD size points to a CD signature. If none of these are true, the ECD may be considered missing. These three cases may handle most of the potential bit flips in the ECD record. To find the ECD offset, the last 64 k plus 22 bytes of the archive may be searched. If it cannot be found there, the last 22 bytes may be treated as an ECD record. The ECD records may not be signature checked, but may be loaded as if valid. The offset plus size checks noted above may determine whether the proper values have been obtained.

If the start of the CD is found in the first stage as described above, each CD record may be loaded and validated. This second stage may read as many CD records as possible. If the CD signature is not found at the start of each record, the process scans forward until the next CD signature is found. This may ensure the process finds as many CD records as possible. Table 2 lists exemplary fields in a CD record and how each field is used during recovery.

TABLE 2

| CD Record | Status |
|---|---|
| Signature | Required (except on first record) |
| Made By Version | Ignorable |
| Extract Version | Ignorable |

TABLE 2-continued

| CD Record | Status |
|---|---|
| GP Bit Flag | Ignorable |
| Compression Method | Handled later |
| Date/Time | Ignorable |
| CRC | Handled later |
| Compressed Size | Handled later |
| Uncompressed Size | Handled later |
| File Name Length | Handled later* |
| Extra Field Size | Required* |
| Comment Size | Required* |
| Disk Number Start | Ignorable |
| Internal File Attributes | Ignorable |
| External File Attributes | Ignorable |
| LH Offset | Handled later* |
| File Name | Handled later |
| Extra Field | Try to load Zip64 extra field if present. Bogus values will be handled later. |
| File Comment | Ignorable |

Consistent with embodiments of the present invention, in order to handle CD records with duplicate names, the process may have a common renaming scheme like file0001.chk, file0002.chk, etc. The goal of doing this may be a last effort by the process to recover text from the items in the archive. Another implementation may be to discard any duplicates.

Next, the file name length may be compared against the local header. If they disagree, it may not be trivial to determine which one is correct. One implementation could look for non-ASCII characters, but that can hit false positives easily or the length may have been corrupted into a smaller value. Another implementation may be to use the offset of the next item and subtract the compressed size, data descriptor, and extra field size to find the file name length. This may be done after the last stage. Another implementation may simply discard the record.

If the calculated size of the extra field by using the sub-fields does not match the extra field size, the process may assume the extra field size is zero and search for the next CD signature. The extra field size may claim to be zero when there are sub-fields present. This may be handled by searching for the next CD signature. There may be no way to validate the comment size. However, this may be handled by searching for the next CD signature.

The third stage in the process may check local headers. This stage may occur when the CD records are read in the second stage. The CD record may specify an offset to the LH record. This LH record may be compared with the CD record, for example, according to Table 3 below. The LH signature may not be checked. If the validation succeeds, the process may have enough information to know the complete size of the item (e.g. the local header plus item data.)

TABLE 3

| LH + CD Common Fields | Details |
|---|---|
| Extract Version | Ignored |
| GP Bit Flag | Required*** |
| Compression Method | Required* |
| Date/Time | Ignored |
| CRC | Ignored |
| Compressed Size | Required* |
| Uncompressed Size | Required* |
| File Name Length | Required (see discussion above about comparing these) |
| Extra Field Length/Extra Field | Required** |
| File Name | Use the name(s) with ASCII chars (<0x80). |

If a LH record fails validation against its CD record, the offset of the LH record may be added to a list of "invalid" offsets. When LH records are recovered in the LH recovery stage (e.g. the fourth stage below), these offsets may be skipped because the process may know that there was an un-repairable flaw in them.

Consistent with embodiments of the invention, there may be different types of compression method recovery. The data recovery process, for example, may assume the data is either "deflated" or "stored." If both are deflate, but with different flavors (i.e. deflate, deflate slower, etc.), the process may use deflate. If one is "store" or "deflate" and the other is an unknown type, the process may use store or deflate. If both are unknown types, the process may fail the validation.

Regarding the case in which one is store and the other deflate, if the compressed and uncompressed sizes are valid (i.e. the LH values match the CD values,) the process may recover the compression method. For example, the process may assume deflate if the compressed size is different from the uncompressed size. Otherwise, the process may assume it is stored. Unless the data is comparatively small, it may be unlikely for the deflated data to be the same size as the inflated data. However, the process may attempt to inflate the data and see if it really was deflated. Moreover, if the compression method and one of the sizes is valid, the process may recover the other size. If the record is stored, the uncompressed and compressed sizes may correct each other. If the record is deflated, the process may inflate as much as possible and use the resulting size.

The extra field in the LH does not need to match the CD value, so there may be no reliable way to validate it. The extra field entries may contain their length, but this may not help if the extra field length is 0. The process may have to trust the EF length. A bogus EF length may mean the process does not know where the data for that record starts. In a similar manner to name length recovery, after the final stage has been completed, the process may correct an EF length by subtracting the length of the item data from the offset of the next item. Regarding data descriptors, bit 3, for example, of a GP bit flag may indicate whether a data descriptor (DD) is present. If the CD and LH disagree, the DD may be considered present if the sizes and CRC in the LH record are 0 but the compressed size in central directory is non-zero. The data descriptor may be loaded using the compressed size and extract version found in the CD record. The values may then be compared as indicated above.

The fourth stage may comprise a recovery process. If there are no CD records in the list, the entire archive may appear as one gap. Otherwise, there may be records in the list that have been validated. For each gap between valid items, this stage may treat them as missing items. This may be an iterative process that may repeat until all the gaps have been checked. For example, the process may start at the beginning of the gap. The bytes may then be loaded into a LH record. The signature may not be checked because it may be corrupted.

If the offset is in the "invalid" list, the process may consider this record invalid. Otherwise, the process may trust the LH record and try to validate it. Next, the process may check the characters in the item name. If there are non-ASCII characters, the record may be invalid. If the extra field is invalid, the record may be considered invalid. If the DD bit is set, the process may scan forward and look for it.

To find the DD, the process may read each byte of the item data, calculate the CRC, and check whether the following bytes form a valid DD. Only two out of compressed size, uncompressed size, and CRC need to match. For stored data, the compressed and uncompressed sizes may be the same. For deflated data, the process can simply inflate the data until the data descriptor is found or the inflation fails.

Another process is to use the offset of the next item. The data descriptor may be at the end of an item, so jumping backwards from the next item may find the data descriptor. This type of data descriptor recovery may happen after this stage because it recovers the items in reverse order so the "next" item always exists.

If the process cannot find the DD, the process may assume the record is invalid. Otherwise, it may calculate the CRC and size by reading or inflating the data. For stored data, the process may require that at least two of compressed size, uncompressed size, or CRC match the data read from the archive. Also, when reading stored data, the process may not exceed the end of the gap. If the record is invalid, the process may scan forward and find the next LH signature. For valid records, the process may jump to the next location in the file using the sizes found and repeat. If the process reaches the end of the current gap, the process may move to the next gap.

Referring now to the drawings, in which like numerals refer to like elements through the several figures, aspects of the present invention and an exemplary operating environment will be described. FIG. 1 and the following discussion are intended to provide a brief, general description of a suitable computing environment in which embodiments of the invention may be implemented. While embodiments of the invention may be described in the general context of program modules that execute in conjunction with an application program that runs on an operating system on a personal computer, embodiments of the invention may also be implemented in combination with other program modules.

An embodiment consistent with the invention may comprise a system for recovering data. The system may comprise a memory storage for maintaining a database and a processing unit coupled to the memory storage. The processing unit may be operative to locate a central directory in a file archive. Also, the processing unit may be operative to determine that a local header located in the file archive is authentic if at least one of a plurality of records in the local header match at least one of a corresponding record in the central directory. The local header may be located in the file archive using an offset specified in the central directory. Moreover, the processing unit may be operative to determine that the local header is valid, and recover item data associated with the local header if the local header is authentic and valid.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, application 106 may include a data recovery application 120. However, embodiments of the invention may be practiced in conjunction with any application program and is not limited to word processing. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as data recovery application 120. While executing on processing unit 102, data recovery application 120 may perform processes including, for example, one or more of the stages of the methods described below. The aforementioned processes are exemplary, and processing unit 102 may perform other processes. While embodiments of the invention may be described in a word processing context, other embodiments may include any type of application program and is not limited to word processing. Other applications 106, that may be used in accordance with embodiments of the present invention, may include electronic mail and contacts applications, word processing applications, spreadsheet applications, database applications, slide presentation applications, drawing or computer-aided application programs, etc.

Figure 2:
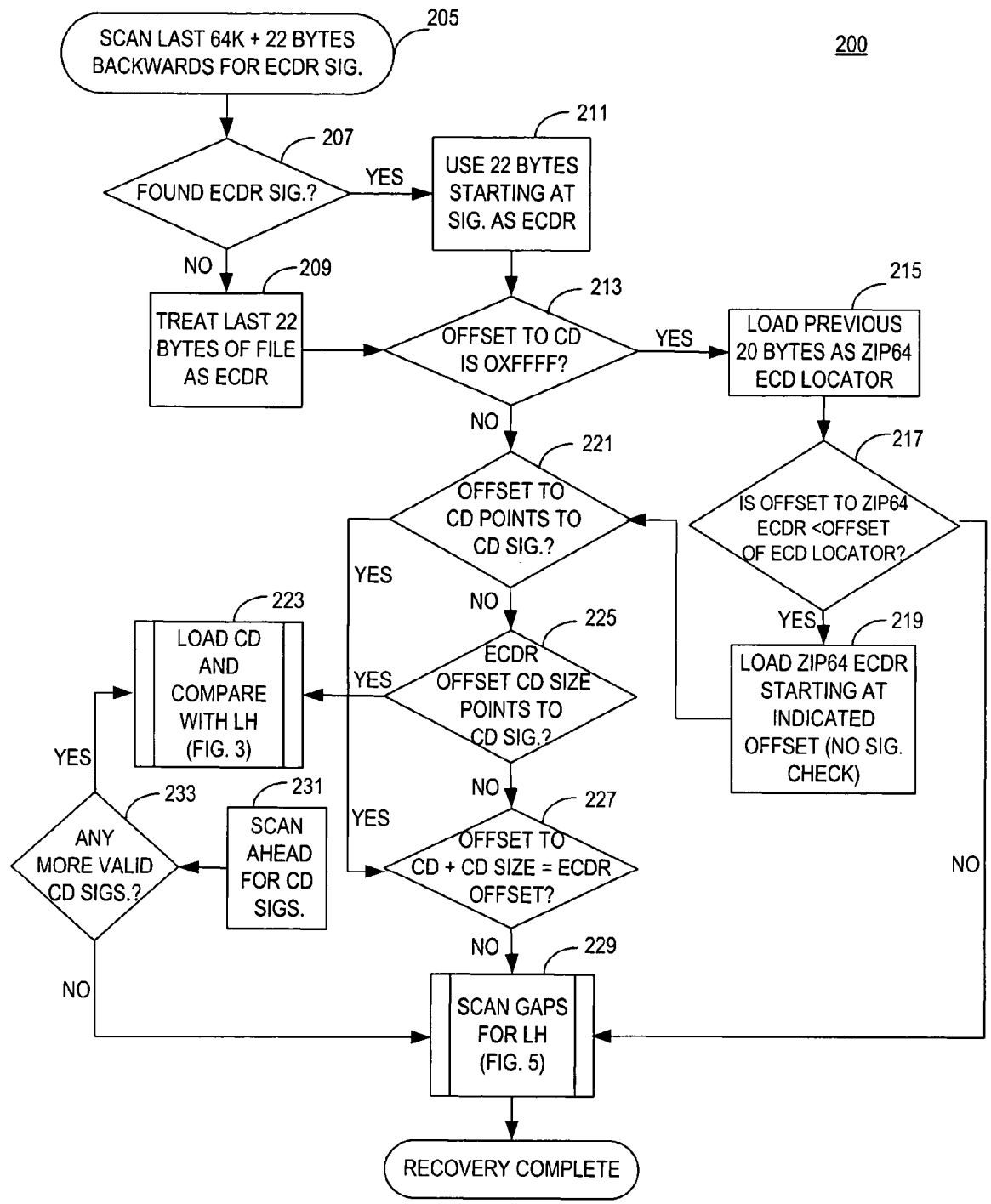
FIG. 2 is a flow chart of an exemplary method for recovering data consistent with an embodiment of the present invention.

FIG. 2 is a flow chart setting forth the general stages involved in an exemplary method 200 consistent with the invention for recovering data using system 100 of FIG. 1. Exemplary ways to implement the stages of exemplary method 200 will be described in greater detail below. Exemplary method 200 may begin with system 100 looking for the file's CD (stage 205.) System 100 may scan the last 64 k plus 22 bytes of the file backwards. In this way, system 100 may look for the end of the central directory and specifically looking for a four byte signature. 64 k may be used because there may be a comment at the end of the file that could be up to that size. The EDC may be 22 bytes long. For example, system 100 may skip over the comment and find the signature.

Then, if system 100 does not find anything that matches (stage 207), then the last 22 bytes may be treated as the ECD record (stage 209.) However, if system 100 found something that matches, system 100 may use what is found (stage 211.) Furthermore, one of the fields of the ECD is an offset to the central directory. If the offset value is a special value, for example 0xFFFFFFFF, then this may indicate that the archive is using "zip 64." Accordingly, there may be a 20 byte record in front of the ECD that may contain extended information about the offset. So if "zip 64" is indicated, (stage 213) then system 100 may load those 20 bytes as the zip 64 record (stage 215.) For example, with zip 64, there may be two extra records in the ECD record. For example, there is the zip 64 locator and the zip 64 end central directory record. The zip 64 end central directory record is basically the same as the end of central directory record except it may be bigger (i.e. it may have more room for bigger offsets.) The normal end central directory record may be limited and may not support four gigabyte archives, for example.

From the locator, there may be an offset in the locator record that points to the zip 64 end central directory. System 100 may load that and may make sure that the offset that is in that locator record is earlier in the file than where system 100 is currently (stage 217.) Accordingly, system 100 may point to something earlier in the file. So if it is not earlier, system 100 may jump to a gap scan (subroutine 229.) Otherwise, system 100 may assume it is valid and load whatever it is pointing at as the zip 64 end of central directory record (stage 219.) So, if it is earlier, system 100 may know that there is good directory information. In other words, system 100 may get the offset of the central directory from either the original end of central directory record or from the zip 64 one. System 100 may determine whether the offset to the CD points to the CD signature (stage 221.) Given the central directory offset, system 100 may look at what it is pointing to. If it is a central directory signature, then system 100 may be confident that the start central directory as been found. Then system 100 may load the CD and compare it with the LH (subroutine 223.)

If the central directory offset does not point to a central directory signature, if could be because: i) the offset is corrupted or ii) the signature it is pointing at is corrupted. Consequently, system 100 may try looking at the end of central directory offset. Specifically, system 100 may look to where the end of the central directory was found minus the size of the central directory and see if that points to a signature (stage 225.) And if this does not point to a signature, then system 100 may try comparing the central directory offset plus the size of the central directory and see if that matches (stage 227.) If either of these conditions is true, system 100 may load the CD and compare it with the LH (subroutine 223.) If not, system 100 may scan gaps for the LH (subroutine 229.) System 100 may then load the record and then scan ahead for a next CD signature (stage 231.) This may continue until all valid CD signatures are exhausted (stage 233.) For example, if one record gets corrupted, then that record may get skipped, but may be picked up later at gap recovery.

Figure 3A:
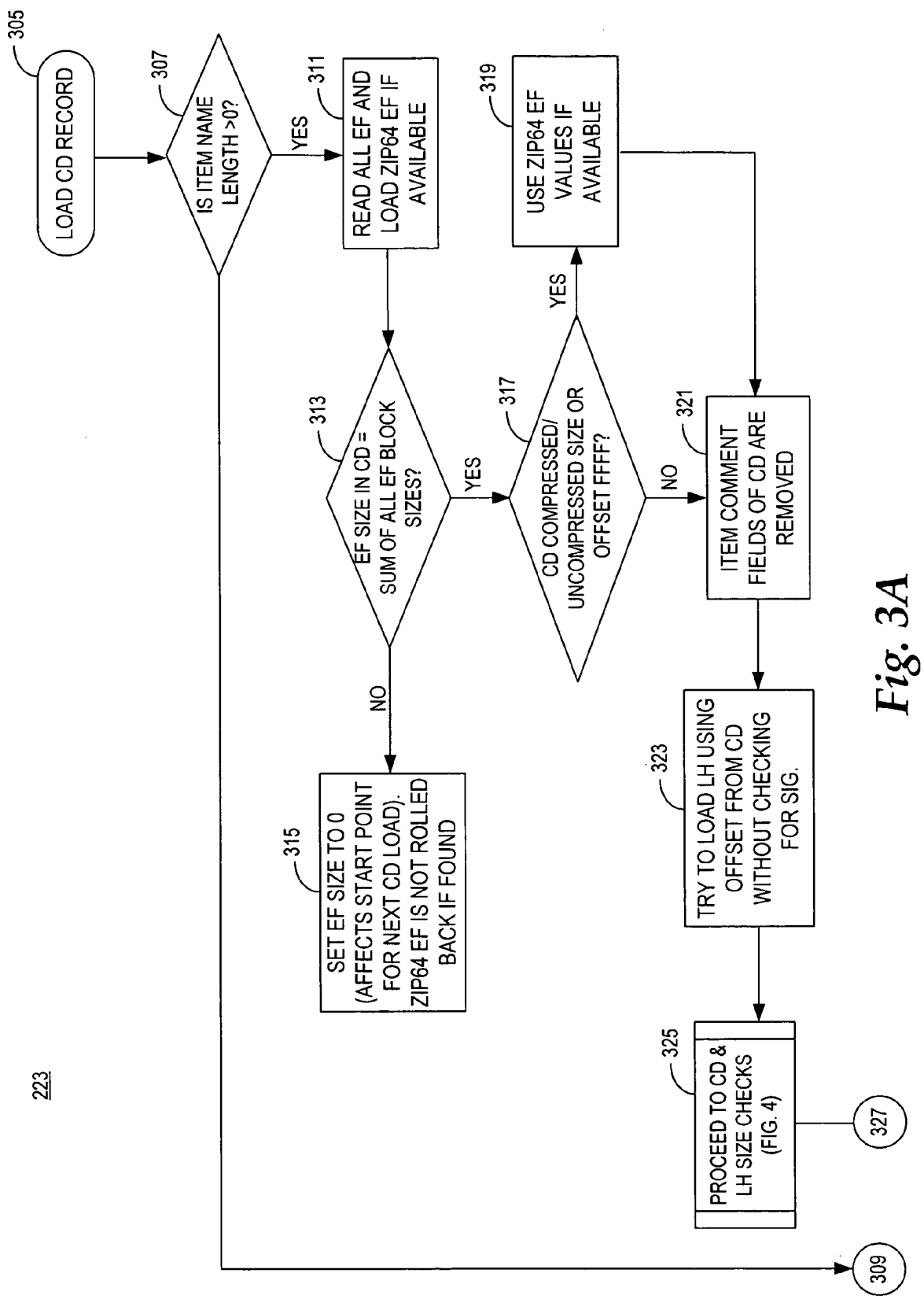
FIGS. 3A and 3B is a flow chart of an exemplary subroutine for loading a CD and comparing it with an LH consistent with an embodiment of the present invention.
Figure 3B:
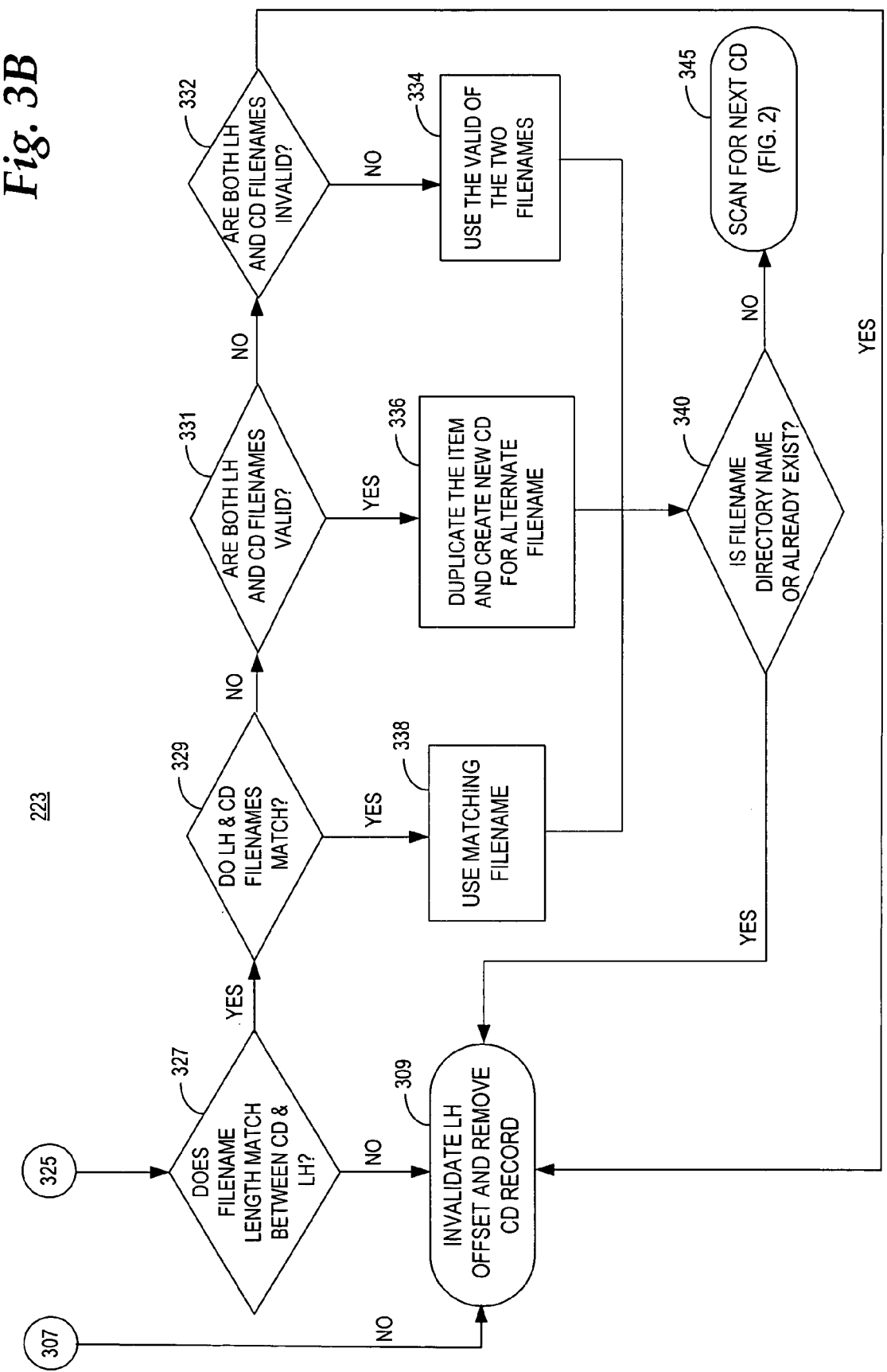

FIGS. 3A and 3B describe exemplary subroutine 223 from FIG. 2 for loading the CD and comparing it with the LH. System 100 may load the central directory record (stage 305.) After the item name length is examined (stage 307), system 100 may determine that the name length is zero. Then system 100 may invalidate the LH offset and remove the CD record (stage 309.) When system 100 finds unrecoverable errors, the local header offset may be marked as being invalid and that offset may not be processed when gap recovery is performed. If the name length is greater than zero (stage 307), system 100 may read the extra field (EF) and the zip 64 EF (stage 311.) Regarding EF, each CD may include extra data comprising, for example, extensible data about that item. The most generally used is for zip 64, so the records in the CD, or the values in a CD record, may be limited to four gigabytes in size and four gigabyte offset. Consequently, bigger values may be needed if the item is more than four gigabytes. The zip specification may define an extra field that may be a record that has eight byte values instead of four byte values. Accordingly, the larger size information may be stored. Then the extra field can have different types of extra field records, the zip 64 may be the most common.

After system 100 reads the EF (stage 311,) system 100 may check the CD record that may have a size parameter that indicates how big the EF should be, for example, how many bytes (stage 313.) For example, system 100 may add up all the records in the extra field that also contain their sizes and compare the values to see if the actual size matches what it should be. If it does not, then system 100 may assume the extra field is invalid and set the extra field size to 0 (stage 315.) One effect that this may have is when system 100 looks for the next central directory record, it might not be there because it is using an EF size of 0. So if any of the size or offset values are a special value, for example 0xFFFFFFFF (stage 317) and the CD record get an indicator that system 100 should use the values (stage 319) from the zip 64 record, system 100 may use zip 64 values. Alternatively, if any of the size or offset values are not the special value (stage 317), system 100 may not use the EF values. System 100 may skip the item comment field, and does nothing with it (stage 321.) Now that the central directory record is loaded, system 100 may use the local header offset from the central directory to try to load the local header (stage 323.) System 100 may then continue to subroutine 325 as describe below in more detail with respect to FIGS. 4A and 4B.

Next system 100 may perform some size validations and try to figure out how big the item really is (stage 327.) Then system 100 may perform some other comparisons between the local header record and the central directory record (stages 329, 331, 332.) If the file name lengths do not match, there may be no way to tell which one is right without doing some additional work once system 100 has done the gap recovery. If the LH and CD filenames do not match (stage 329), system 100 compares the text, e.g., the strings themselves. If they do not match, system 100 may determine if they are both valid names (stage 331.) For example, system 100 may determine if the LH and CD look like names that an application program would expect because file names may be written in a certain format, e.g., in ASCII characters. In other words, system 100 may look for names that may actually be used. If both of them are not valid, then system 100 may bail out on that item and assume it is bogus. If only one of them is valid, then system 100 may use that name as the valid name (stage 334.) And if both names are valid, then system 100 may add a record for each name (stage 336.) For example, the problem may be just a bit flip and an A turned into a B. Because, at this point system, 100 may not tell which one is correct or not, system 100 may add a record for both names. If they match, system 100 may use that name (stage 338.)

Next, system 100 may determine if it has already seen an item with the determined name (stage 340.) If the file name is a directory name, then system 100 may throw it out because system 100 may not write directory names. And if system 100 already found an item with this name, duplicate names may not be allowed, so system 100 may throw it out (stage 340.) If the condition is true, then system 100 may proceed to stage 309. And if not, system 100 may scan for the next CD, and return to FIG. 2 stage 231 (stage 345.)

Figure 4A:
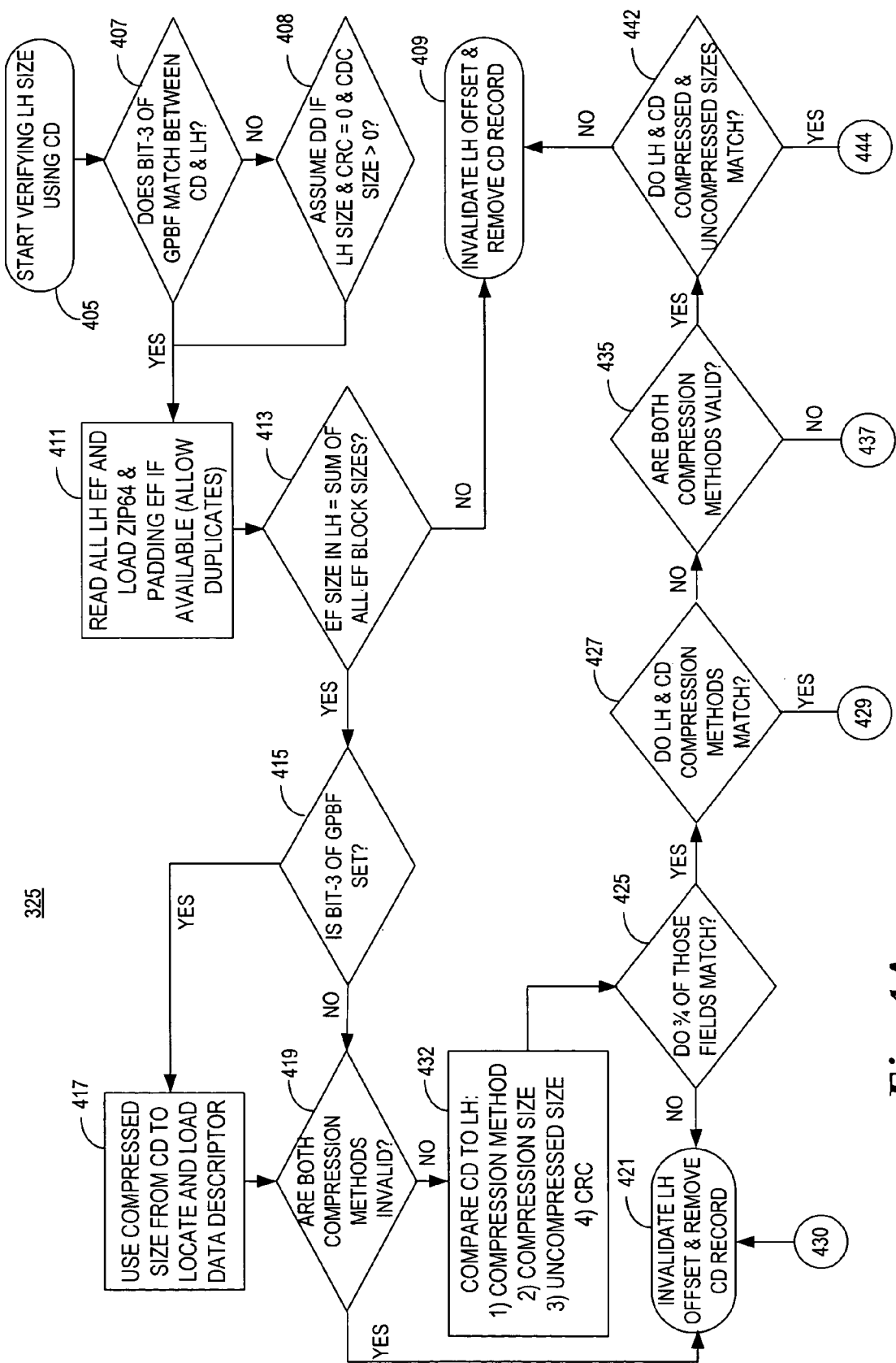
FIGS. 4A and 4B is a flow chart of an exemplary subroutine for checking CD and LH size consistent with an embodiment of the present invention.
Figure 4B:
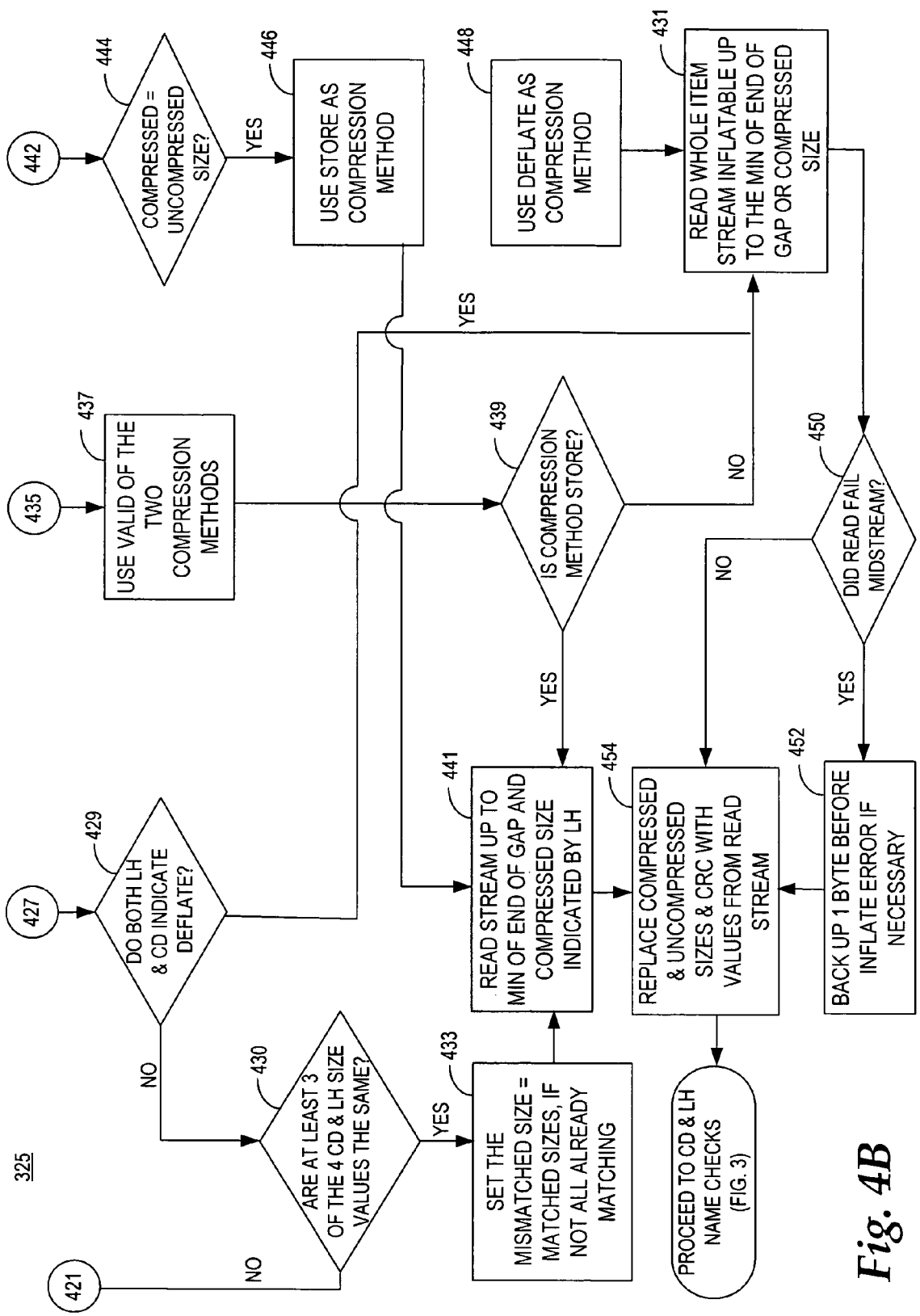

FIGS. 4A and 4B describe exemplary subroutine 325 for CD and LH size checks. After system 100 has a local header offset from the central directory record, system 100 may take that offset and load whatever data is there into a local header in memory (stage 405.) GPBF may comprise a field in the local header, e.g., a bit field. When bit 3 of this bit field is on, this may indicate that a data descriptor is used (stage 407.) For example, if the central directory and local header do not agree on this bit, then there may be a data descriptor there. Accordingly, system 100 may bail out and save that item as not recoverable (stage 409) and return to stage 231 of FIG. 2.

If, however, there is a match (stage 407), system 100 may load the extra fields (stage 411.) If the EF size in LH does not equal the sum of all EF block sizes, system 100 may bail out and save that item as not recoverable (stage 409) and return to stage 231 of FIG. 2. If, however, the EF size in LH equals the sum of all EF block sizes, system 100 may determine if bit three of the GPB field is set (stage 415.) In other words, if bit three of the GPB field is set, there may be a data descriptor. If there is a data descriptor, the real sizes may not be in the local header, they may be in the data descriptor that may follow the item data. Accordingly, system 100 may use the compressed size value that was found in the central directory to skip forward and find the data descriptor (stage 417.) And then system 100 may use the sizes found in the data descriptor later when the sizes are compared.

Next, system 100 may perform compression method validation. In other words, one of the fields in both the central directory and the local header is the type of compression used with this item. So if they are both invalid, then there may be nothing system 100 can do. Accordingly, system 100 may bail out and save that item as not recoverable (stage 421) and return to stage 231 of FIG. 2. Otherwise, if at least one of the compression methods is valid (stage 419), system 100 may do some recovery based on matching, for example, the four values shown in stage 423. For example, if three out of four of them match (stage 425), then system 100 may interpolate and recover the other value. If the compression methods match (stage 427) and they both deflate (stage 429), then system 100 may try to read the whole item until the deflation algorithm fails, hits the end of the gap, or compressed size (stage 431.) Because once system 100 starts running into garbage data, the decompression algorithm may stop, so if the compressed size is correct, then system 100 may deflate up to that compressed size. If the compressed size was bogus, then system 100 may inflate until it fails or until the compressed size is hit.

If LH and CD both do not indicate deflate (stage 429), system 100 may set the mismatched size from the matched sizes (stage 433.) Because if the data is stored, then the compressed size may be equal to the uncompressed size and there are three out of four matching here so system 100 can figure out which one is correct. If the uncompressed size is right, then the compressed size should be the uncompressed size and vice versa. And after that, system 100 reads the stream up to the compressed size. Going back up to where local header and central directory compression methods match, if they don't match (stage 427,) system 100 may see if they are both valid (stage 435.) So one of them might be deflated and one might be a bit flip and now is bogus. So, if only one of them is valid in stage 435, system 100 may use the valid of the two compression methods (stage 437.) Next system 100 may determine if the compression method is stored (stage 439.) If the valid one is stored, system 100 goes over to the stored site (stage 441,) otherwise it goes down to the deflation site (stage 431.) And going back up, if they are both valid in stage 435, this may mean the one is store and one is deflate. So, system 100 may try to use the sizes to figure out which one is right. So, if the compressed sizes match and the uncompressed sizes match (stage 442) and they are equal (stage 444), then system 100 may choose store as the compression method (stage 546). And if they are not equal, then system 100 may choose deflate as the compression method (stage 448.)

Next, system 100 reads the whole item trying to inflate or decompress as much as possible. If this fails, (stage 450) then system 100 goes back up one byte and determine that is the size (stage 452). Then, when system 100 reads this data again, it will stop 1 byte before the failure and does not hit the failure. In other words, system 100 truncates the item at that point and then both of the reading for stored and deflate flow into this replace compressed items stage. So just as system 100 is reading, it may recalculate the CRC and make sure the right value is stored and update any size changes (stage 454.) Then the process returns to stage 327 of FIGS. 3A and 3B.

Figure 5A:
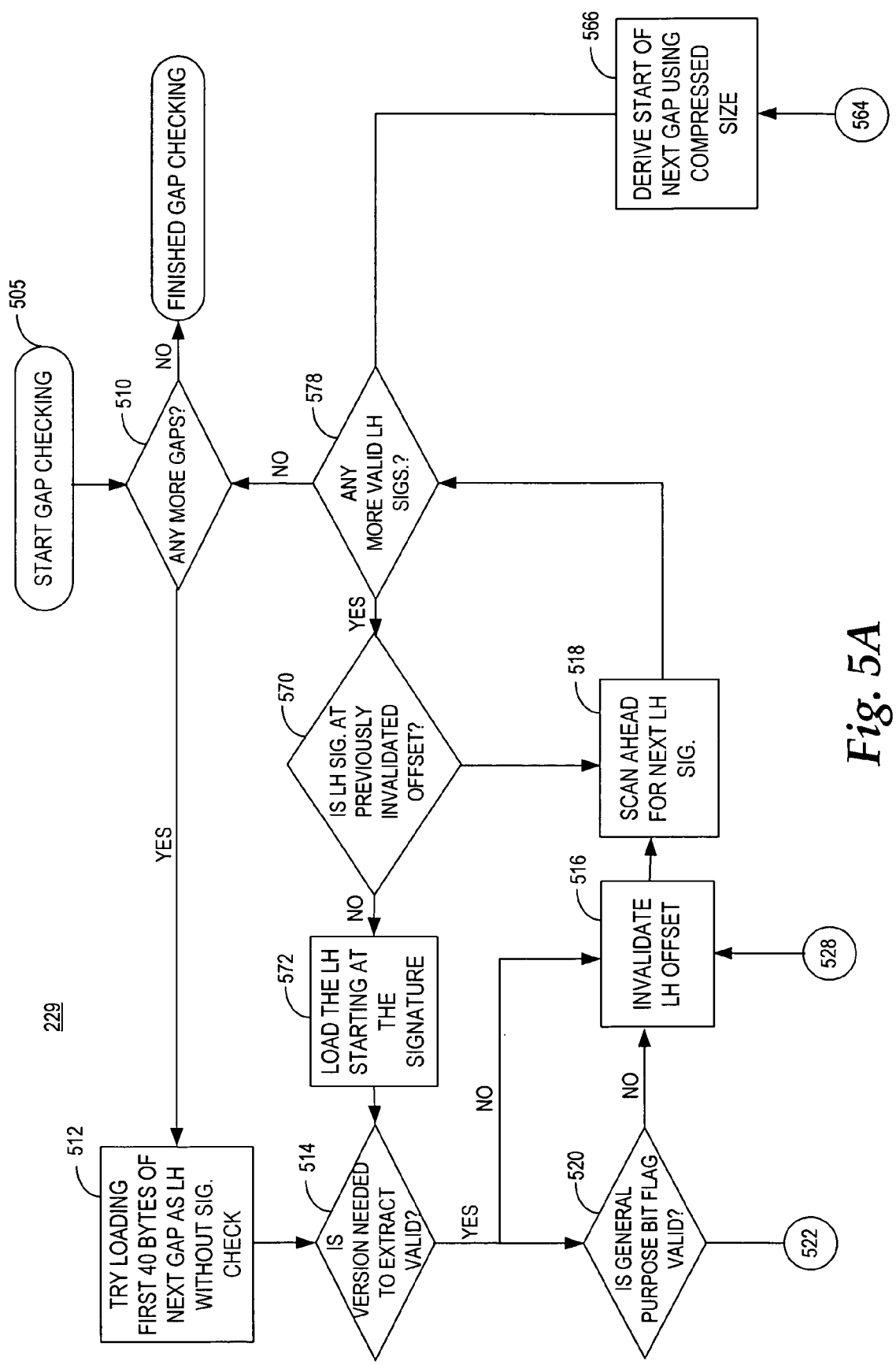
FIGS. 5A, 5B, and 5C is a flow chart of an exemplary subroutine for scanning gaps for LH consistent with an embodiment of the present invention.
Figure 5B:
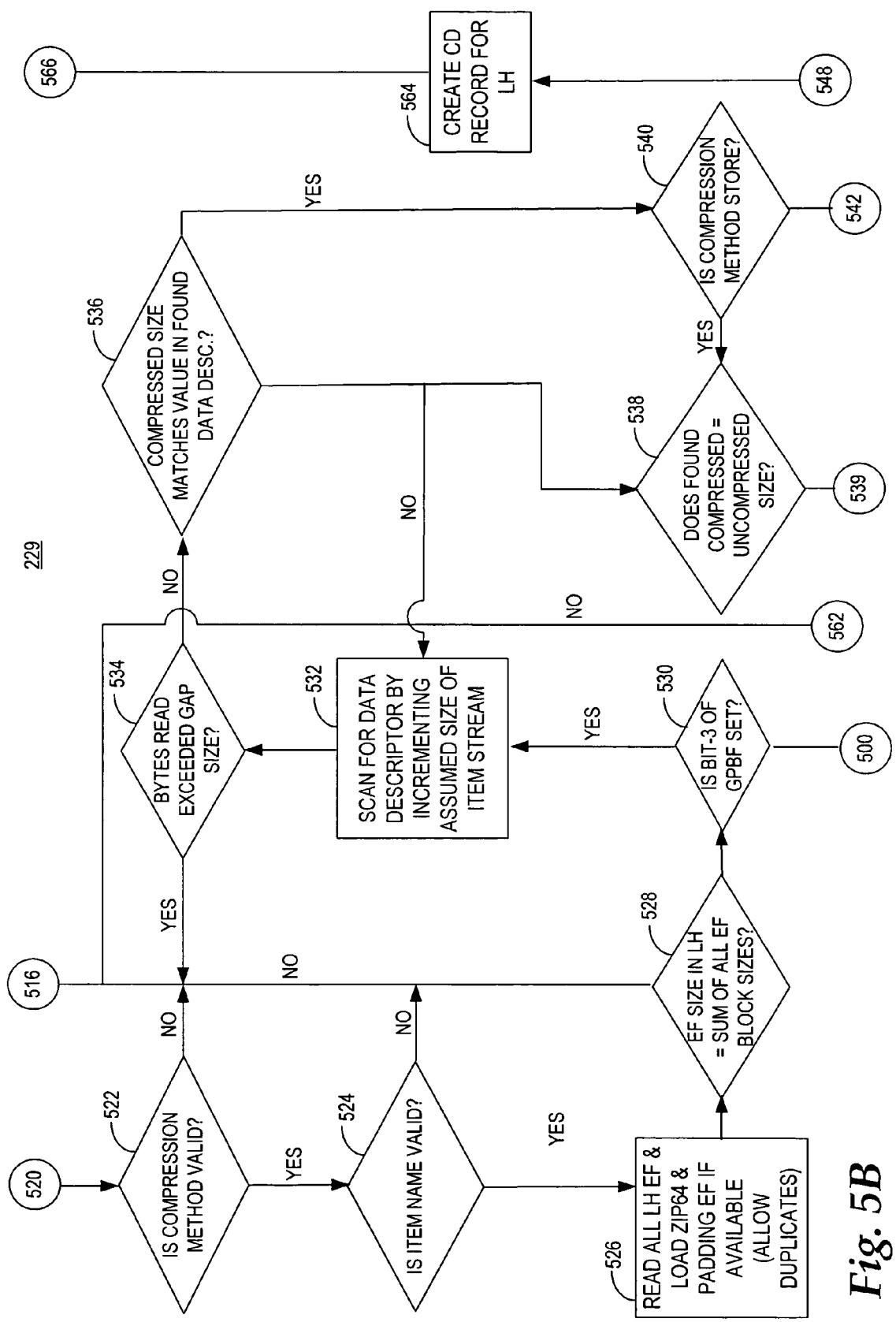
Figure 5C:
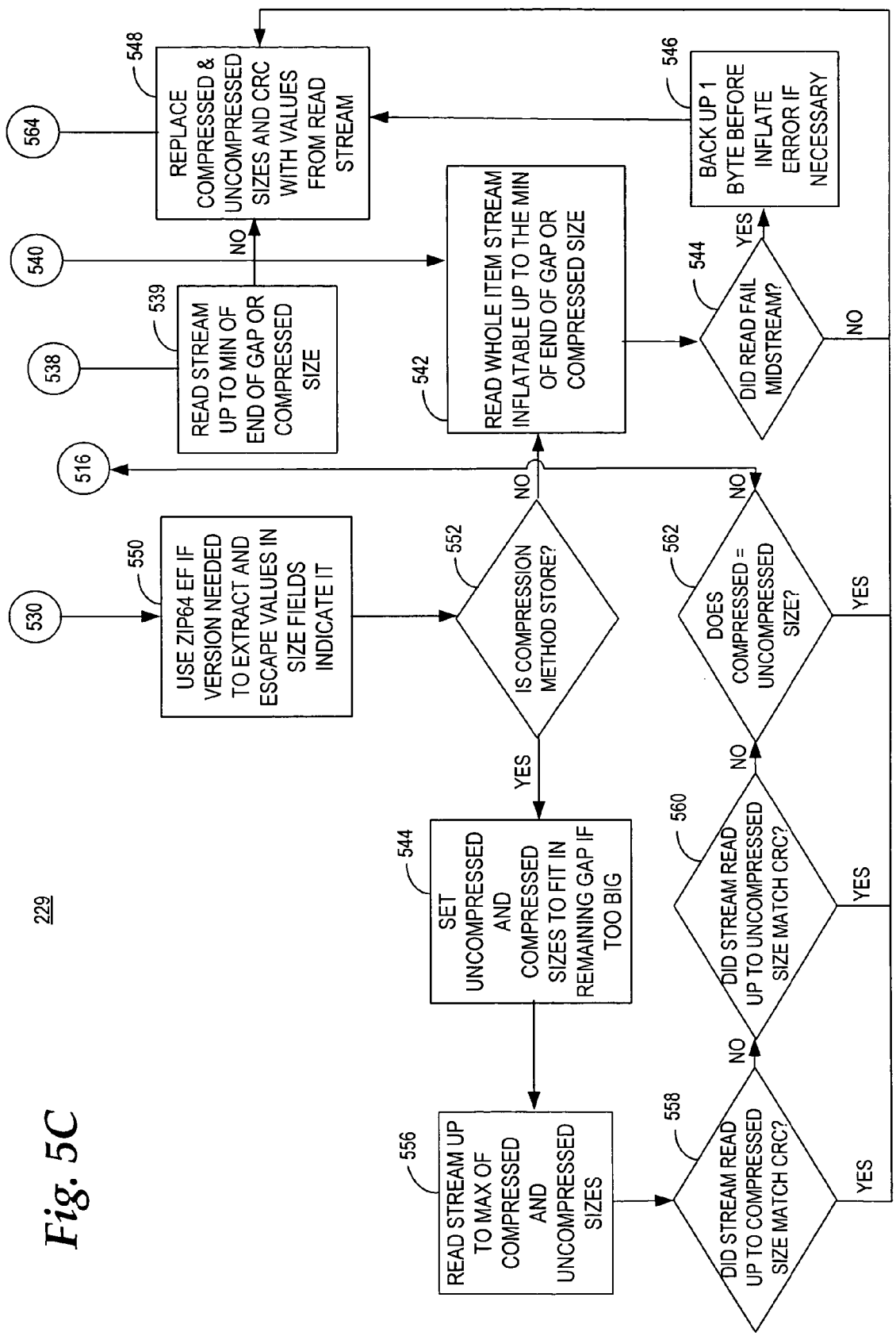

FIGS. 5A, 5B, and 5C describe exemplary subroutine 429 from FIG. 2 for scanning gaps for the LH. In the event that system 100 has found some central directory record as described above, then there may be multiple gaps between the valid items. Accordingly, system 100 may determine if there are any more gaps (stage 510.) If there are more gaps, system 100 may load the first 40 bytes of the next gap as the local header (stage 512.) For example, the local header may be obstructed or the data structure may be 40 bytes plus the name and the extra field. Consequently, system 100 may check the version needed (stage 514) to extract so when gap checking is done, there may be no central directory record to cross-reference it with. System 100 may assume that the values are correct, so if the version needed to extract is not one that is supported, then system 100 may bail out and go look for the next record (stages 516 and 518.) Next, system 100 may determine if the GPBF is valid (stage 520.) If it is not valid, then system 100 may bail out and go look for the next record (stages 516 and 518.) The next check may be the compression method (stage 522.) This may comprise the same store/deflate decision as described above. The item name may be tested to see if it is a valid item name (stage 524.) If not, there may be no point in trying to recover it (stage 516.) Once the aforementioned validity checks are performed, system 100 reads the extra fields (stage 526.)

Next, system 100 checks bit 3 of the GPBF, and if it is set, system 100 scans for the data descriptor (532.) For example, system 100 may try size 0, and see if something that looks like a data descriptor is there. Next system 100 may try 1, 2, 3 (basically going forward) to keep looking until the end of the gap is found (stage 534.) So, if byte size exceeds the gap size, system 100 may stop looking for a data descriptor outside of the gap. In other words, if system 100 made it all the way to the end and did not find one, system 100 may decide if it is valid. For example, the data descriptor may have the actual size fields. This is, what system 100 scans for because the size in the local header may just be 0. So system 100 may assume the item size is 0, load the data there in the data descriptor, and then compares the compressed size to 0. Next, system 100 compare to 1, 2, and 3 etc. (stage 536.) In other words, system 100 may set the compressed size to 0, jump forward 0 bytes, read that data (in the data descriptor), and see if it says the compressed size is 0. And, if it is not, then system 100 tries the process with a compressed size of one byte. System 100 may repeat by increasing the compressed size until the end of the gap is reached or something is found.

If the compression method is store, system 100 may also check to see if the uncompressed size is the same as the compressed size (stage 538.) For the method, for example, a little better checking may be obtained (stage 540.) And if it is not store (stage 540,) then a false positive may be hit. If so, system 100 may take that aside as the compressed size and is done with it. For example, system 100 may read up to this compressed size or inflate up to the compressed size (stage 542), determine if the read fails (stage 544), stream back up a byte (stage 546), and then adjust the size as needed (stage 548).

When the bit 3 is not set (stage 530), system 100 may get the values from the Zip64 EF if it is indicated in its presence (stage 550). If the compression method is not stored (stage 552), (e.g. if it deflates) then system 100 may uncompress as much as possible up to the end of the gap (stage 554.) If it is store and the archive was truncated, then the sizes may be bigger than the gap. So, system 100 may truncate the sizes to fit in the gap (stage 554) and then read as much as it can (stage 556.) And then, if any of these match up correctly, then system 100 may consider that they are valid (stages 558, 560, and 562). Because the CRC (the compressed size (stage 558) and uncompressed size (stage 560), may not match due to a bit flip, for example, system 100 may read to the max of both of them. Whichever one is bigger, system 100 may read up to that. Once system 100 has gotten enough information about this item, system 100 may create, as a replacement, a new central directory record using the values that system 100 has determined. Then system 100 may find the start of the next gap (stage 566), taking whatever space has been used by this item out of this current gap, and repeat the process (stage 510).

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for recovering data, the method comprising:
    using at least one of a plurality of offset plus size checks to locate a central directory in a file archive, wherein using the at least one of the plurality of offset plus size checks comprises:
    determining whether the file archive comprises an end of central directory record, wherein determining whether the file archive comprises the end of central directory record comprises scanning the file archive backwards for an end of central directory signature,
    in response to determining that the file archive comprises the end of central directory record, retrieving an offset of the central directory from the end of central directory record,
    determining whether the offset of the central directory comprises a special value indicating that the file archive uses a zip 64 type,
    in response to determining that the offset of the central directory does not comprise the special value indicating that the file archive uses a zip 64 type, locating the central directory at the retrieved offset from the end of central directory record, and
    in response to determining that the offset of the central directory comprises the special value indicating that the file archive uses a zip 64 type:
        scanning the file archive for a zip 64 end of central directory record,
        retrieving an offset for the central directory from the zip 64 end of central directory record, and
        locating the central directory at the retrieved offset from the zip 64 end of central directory record;
    determining that a local header located in the file archive is authentic if at least one of a plurality of records in the local header match at least one of a corresponding record in the central directory, the local header being located in the file archive using the retrieved offset specified in the central directory;
    determining that the local header is valid wherein at least one of the plurality of offset plus size checks are used to find items in the file archive and to resolve inconsistencies between records in the file archive; and
    recovering item data associated with the local header wherein at least one of the plurality of offset plus size checks are performed to determine if the local header is authentic and valid.

2. The method of claim 1, wherein locating the central directory in the file archive further comprises locating the central directory in the file archive that includes at least one of the following: items stored as contiguous ranges of bytes in the file archive; the items in the file archive being preceded by the local header that specifies a size of the item; and the file archive containing the central directory describing a content of the file archive.

3. The method of claim 1, wherein determining that the local header located in the file archive is authentic further comprises determining the size of the item data associated with the local header.

4. The method of claim 1, wherein determining that the local header is valid further comprises determining that the local header is valid if no non-ASCII characters are present in the local header file name.

5. The method of claim 1, wherein determining that the local header is valid further comprises determining that the local header is valid if an extra field located in the local header is valid.

6. The method of claim 1, wherein determining that the local header is valid further comprises determining that the local header is valid if:
   a data descriptor indicator is present in the local header; and
   a data descriptor is present in the item data associated with the local header.

7. The method of claim 6, wherein determining that the local header is valid if the data descriptor indicator is present in the local header further comprises determining that a general purpose bit flag in the local header indicates that the data descriptor is present in the item data.

8. A system for recovering data, the system comprising:
   a memory storage for maintaining a database; and
   a processing unit coupled to the memory storage, wherein the processing unit is operative to:
   use at least one of a plurality of offset plus size checks to locate a central directory in a file archive, wherein being operative to use the at least one of the plurality of offset plus size checks comprises being operative to:
   determine whether the file archive comprises an end of central directory record, wherein being operative to determine whether the file archive comprises the end of central directory record comprises being operative to scan the file archive backwards for an end of central directory signature,
   in response to determining that the file archive comprises the end of central directory record, being further being operative to retrieve an offset of the central directory from the end of central directory record,
   determine whether the offset of the central directory comprises a special value indicating that the file archive uses a zip 64 type,
   in response to determining that the offset of the central directory does not comprise the special value indicating that the file archive uses a zip 64 type, being further operative to locate the central directory at the retrieved offset from the end of central directory record, and
   in response to determining that the offset of the central directory comprises the special value indicating that the file archive uses a zip 64 type:
      scan the file archive for a zip 64 end of central directory record,
      retrieve an offset for the central directory from the zip 64 end of central directory record, and
      locate the central directory at the retrieved offset from the zip 64 end of central directory record;
   determine that a local header located in the file archive is authentic if at least one of a plurality of records in the local header match at least one of a corresponding record in the central directory, the local header being located in the file archive using the retrieved offset specified in the central directory;
   determine that the local header is valid wherein at least one of the plurality of offset plus size checks are used to find items in the file archive and to resolve inconsistencies between records in the file archive; and
   recover item data associated with the local header wherein at least one of the plurality of offset plus size checks are performed to determine if the local header is authentic and valid.

9. The system of claim 8, wherein the processing unit being operative to determine that the local header located in the file archive is authentic further comprises the processing unit being operative to determine the size of the item data associated with the local header.

10. The system of claim 8, wherein the processing unit being operative to determine that the local header is valid further comprises the processing unit being operative to determine that the local header is valid if no non-ASCII characters are present in the local header file name.

11. The system of claim 8, wherein the processing unit being operative to determine that the local header is valid further comprises the processing unit being operative to determine that the local header is valid if an extra field located in the local header is valid.

12. The system of claim 8, wherein the processing unit being operative to determine that the local header is valid further comprises the processing unit being operative to determine that the local header is valid if:
   a data descriptor indicator is present in the local header; and
   a data descriptor is present in the item data associated with the local header.

13. The system of claim 12, wherein the processing unit being operative to determine that the local header is valid if the data descriptor indicator is present in the local header further comprises the processing unit being operative to determine that a general purpose bit flag in the local header indicates that the data descriptor is present in the item data.

14. A computer-readable storage medium which stores a set of instructions which when executed performs a method for recovering data, the method executed by the set of instructions comprising:
   using at least one of a plurality of offset plus size checks to locate a central directory in a file archive, wherein using the at least one of the plurality of offset plus size checks comprises:
   determining whether the file archive comprises an end of central directory record, wherein determining whether the file archive comprises the end of central directory record comprises scanning the file archive backwards for an end of central directory signature,
   in response to determining that the file archive comprises the end of central directory record, retrieving an offset of the central directory from the end of central directory record,
   determining whether the offset of the central directory comprises a special value indicating that the file archive uses a zip 64 type,
   in response to determining that the offset of the central directory does not comprise the special value indicating that the file archive uses a zip 64 type, locating the central directory at the retrieved offset from the end of central directory record, and
   in response to determining that the offset of the central directory comprises the special value indicating that the file archive uses a zip 64 type:
      scanning the file archive for a zip 64 end of central directory record,
      retrieving an offset for the central directory from the zip 64 end of central directory record, and
      locating the central directory at the retrieved offset from the zip 64 end of central directory record;

determining that a local header located in the file archive is authentic if at least one of a plurality of records in the local header match at least one of a corresponding record in the central directory, the local header being located in the file archive using the retrieved offset specified in the central directory;

determining that the local header is valid wherein at least one of the plurality of offset plus size checks are used to find items in the file archive and to resolve inconsistencies between records in the file archive; and recovering item data associated with the local header wherein at least one of the plurality of offset plus size checks are performed to determine if the local header is authentic and valid.

15. A computer-readable storage medium of claim 14, wherein locating the central directory in the file archive further comprises locating the central directory in the file archive that includes at least one of the following: items stored as contiguous ranges of bytes in the file archive; the items in the file archive being preceded by the local header that specifies a size of the item; and the file archive containing the central directory describing a content of the file archive.

16. A computer-readable storage medium of claim 14, wherein determining that the local header located in the file archive is authentic further comprises determining the size of the item data associated with the local header.

17. A computer-readable storage medium of claim 14, wherein determining that the local header is valid further comprises determining that the local header is valid if no non-ASCII characters are present in the local header file name.

18. A computer-readable storage medium of claim 14, wherein determining that the local header is valid further comprises determining that the local header is valid if an extra field located in the local header is valid.

19. A computer-readable storage medium of claim 14, wherein determining that the local header is valid further comprises determining that the local header is valid if:

a data descriptor indicator is present in the local header; and a data descriptor is present in the item data associated with the local header.

20. A computer-readable storage medium of claim 19, wherein determining that the local header is valid if the data descriptor indicator is present in the local header further comprises determining that a general purpose bit flag in the local header indicates that the data descriptor is present in the item data.

* * * * *

UNITED STATES PATENT AND TRADEMARK OFFICE
CERTIFICATE OF CORRECTION

| | | |
|---|---|---|
| PATENT NO. | : 7,603,390 B2 | Page 1 of 1 |
| APPLICATION NO. | : 11/182117 | |
| DATED | : October 13, 2009 | |
| INVENTOR(S) | : Dan Jump et al. | |

It is certified that error appears in the above-identified patent and that said Letters Patent is hereby corrected as shown below:

In the Claims:
In column 15, line 37, in Claim 8, after "further" delete "being".

Signed and Sealed this
First Day of February, 2011

David J. Kappos
*Director of the United States Patent and Trademark Office*